United States Patent [19]
Kawami et al.

[11] Patent Number: 4,872,199
[45] Date of Patent: Oct. 3, 1989

[54] BATTERY-FEED CIRCUIT FOR EXCHANGE

[75] Inventors: Shigeru Kawami, Kawasaki; Takashi Tabu, Tokyo; Shigeo Sano; Nobuyuki Masuda, both of Kawasaki, all of Japan

[73] Assignee: Fujitsu Limited, Kawasaki, Japan

[21] Appl. No.: 296,273

[22] Filed: Jan. 11, 1989

Related U.S. Application Data

[63] Continuation of Ser. No. 813,869, Dec. 27, 1985, abandoned.

[30] Foreign Application Priority Data

Dec. 27, 1984 [JP] Japan ................... 59-273830

[51] Int. Cl.[4] ........................................... H04M 19/00
[52] U.S. Cl. .................... 379/413; 379/398; 379/405
[58] Field of Search ............... 379/339, 399, 398, 400, 379/401, 402, 405, 412, 413, 345, 342, 324

[56] References Cited

U.S. PATENT DOCUMENTS

| | | | |
|---|---|---|---|
| 4,071,879 | 1/1978 | Falk ................................ | 361/245 |
| 4,283,604 | 8/1981 | Chambers, Jr. .................. | 379/405 X |
| 4,287,393 | 9/1981 | Reuvekamp ..................... | 379/413 X |
| 4,398,143 | 8/1983 | Bonis ............................... | 379/413 X |
| 4,456,991 | 6/1984 | Chea, Jr. et al. ................ | 379/339 X |
| 4,476,350 | 10/1984 | Aull et al. ........................ | 379/382 |
| 4,532,381 | 7/1985 | Rosenbaum et al. ........... | 379/405 X |
| 4,539,438 | 9/1985 | Rosenbaum et al. ........... | 379/413 X |
| 4,600,811 | 7/1986 | Hayashi et al. .................. | 379/405 X |
| 4,612,417 | 9/1986 | Toumani ........................... | 379/413 |

FOREIGN PATENT DOCUMENTS

| | | | |
|---|---|---|---|
| 0116767 | 8/1984 | European Pat. Off. . | |
| 0150658 | 11/1980 | Japan ................................... | 379/324 |
| 0141258 | 6/1986 | Japan ................................... | 379/400 |

OTHER PUBLICATIONS

"A High-Voltage IC for a Transformerless Trunk and Subscriber Line Interface", Aull et al., I.E.E.E. Journal of Solid-State Circuits, vol. SC-16, No. 4, Aug. 1981, pp. 261-266.

Patent Abstracts of Japan, unexamined applications, field E, vol. 8, No. 206, Sep. 20, 1984.

Primary Examiner—Jin F. Ng
Assistant Examiner—Randall S. Vaas
Attorney, Agent, or Firm—Staas & Halsey

[57] ABSTRACT

A compact battery-feed circuit for an exchange, including two feedback circuits provided for two wires, one being a dc feedback circuit for the dc voltage on the two wires, and the other being an ac feedback circuit for the ac voltage signal on the two wires.

28 Claims, 5 Drawing Sheets

BATTERY-FEED CIRCUIT FOR EXCHANGE

This is a continuation of co-pending application Ser. No. 813,869 filed on Dec. 27, 1985, now abandoned.

BACKGROUND OF THE INVENTION

1. Field of the Invention

The present invention relates to an internal-termination type polarity-reversal battery-feed circuit for supplying a speech current or supervision current to a subscriber line or trunk line of an exchange.

The battery-feed circuit according to the present invention not only functions to supply speech current for a subscriber or trunk line, transmit a voice signal to the line, and terminate the voice signal from the line, but also to send a polarity-reversal line signal.

2. Description of the Related Art

An exchange is equipped with a battery-feed circuit for supplying a speech current to telephone sets. The main functions of this battery-feed circuit are as follows:

(i) Supply of the speech current and/or the supervision current;
(ii) Transmission of voice signals to the speech line and the reception thereof from the speech line;
(iii) Termination of the speech line for the received voice signal;
(iv) Transmission of the polarity-reversal signal, etc.

This prior art battery-feed circuit requires separate circuits for each of these functions, and therefore requires many components, which enlarges the battery-feed circuit, complicates it, and raises its cost. Further, one of its components, an electronic inductor circuit, has a high impedance against common mode signals (longitudinal signals), and therefore cannot terminate an undesirable common mode signal in the speech line to ground using a low resistance. Further, when noiseless polarity reversal is required, and LC filter circuit is needed, which has the disadvantages of increased weight and poor packing density. The capacitance and inductance elements in the LC filter circuit make it difficult to form the battery-feed circuit as an integrated circuit.

SUMMARY OF THE INVENTION

Accordingly, it is an object of the present invention to provide an improved battery-feed circuit, which can perform the above-described functions, in a circuit of compact construction.

According to a fundamental aspect of the present invention, there is provided a battery-feed circuit for an exchange comprising: a first reference resistance connected to a first wire; a second reference resistance connected to a second wire; a first amplifier with a unity gain and summation function for supplying a speech current and voice signal to the first wire, the input terminal of which is connected to a first direct-current (dc) amplifier, an alternative-current (ac) differential amplifier and a voice signal source, the first direct-current (dc) amplifier having an appropriate dc gain and summation function, the input terminal of which is connected to the first wire and a dc control signal generating circuit, the ac differential amplifier having an appropriate ac gain, the input terminal of which is connected to the first wire and a second line via coupling capacitors; a second amplifier having a unity gain and summation function for supplying a speech current and voice signal to the second wire, the input terminal of which is connected to a second direct-current (dc) amplifier, the alternating current (ac) differential amplifier and the voice signal source, and the second direct-current (dc) amplifier having an appropriate dc gain and summation function, the input terminal of which is connected to the second line.

According to another aspect of the present invention, there is provided a battery-feed circuit for an exchange characterized in that an alternating-current signal appearing between first and second wires is fed back to first and second reference resistances, provided for each of the first and second lines, through an alternating-current feedback path, and in that a direct-current voltage on the first and second wires is fed back independently to the first and second reference resistances by means of a direct-current feedback path, so that a desired alternating-current terminating resistance and a desired direct-current feeding resistance are realized.

BRIEF DESCRIPTION OF THE DRAWINGS

Embodiments of the battery-feed circuit for the exchange in accordance with the present invention will be described with reference to the accompanying drawings, in which.

DESCRIPTION OF THE PREFERRED EMBODIMENTS

Before describing the preferred embodiments, a prior art battery-feed circuit will be described for reference purposes.

Figure 1:
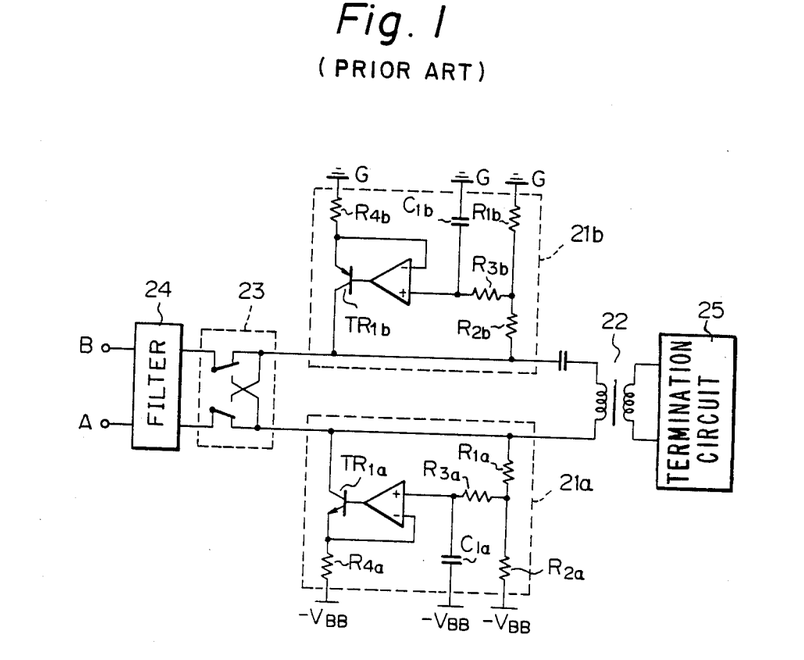
FIG. 1 is a circuit diagram of a battery-feed circuit of the prior art.

A polarity-reversal type battery-feed circuit of the prior art is shown in FIG. 1. In FIG. 1, 21a and 21b are electronic inductor circuits, 22 is a transformer, 23 are contacts of a polarity-reversal relay, 24 is a filter circuit, and A and B are two wires connected to a telephone set (not shown).

This battery-feed circuit has separate circuits for each of its functions. That is, the electronic inductor circuits 21a and 21b function to supply the speech current and/or the supervision current. Namely, the speech current flows from the ground G through a resistor $R_{4b}$ and a transistor $TR_{1b}$ to the wire B and back from line A through a transistor $TR_{1a}$ and a resistor $R_{4a}$ to power supply source $-V_{BB}$. The value of the speech current is determined by the ratio of resistors $R_{1b}$ and $R_{2b}$ (also, that of resistors $R_{1a}$ and $R_{2a}$).

The transformer 22 has the function of transmission and reception of the voice signal to and from the speech line as well as that of termination of the speech line for the voice signal through termination circuit 25. The polarity-reversal relay 23 has the function of sending the polarity-reversal signal. The filter circuit 24 is used for a noiseless polarity reverse function and is added when the battery-feed circuit is adapted to public telephones requiring noiseless polarity reverse for a charging signal.

Figure 5:
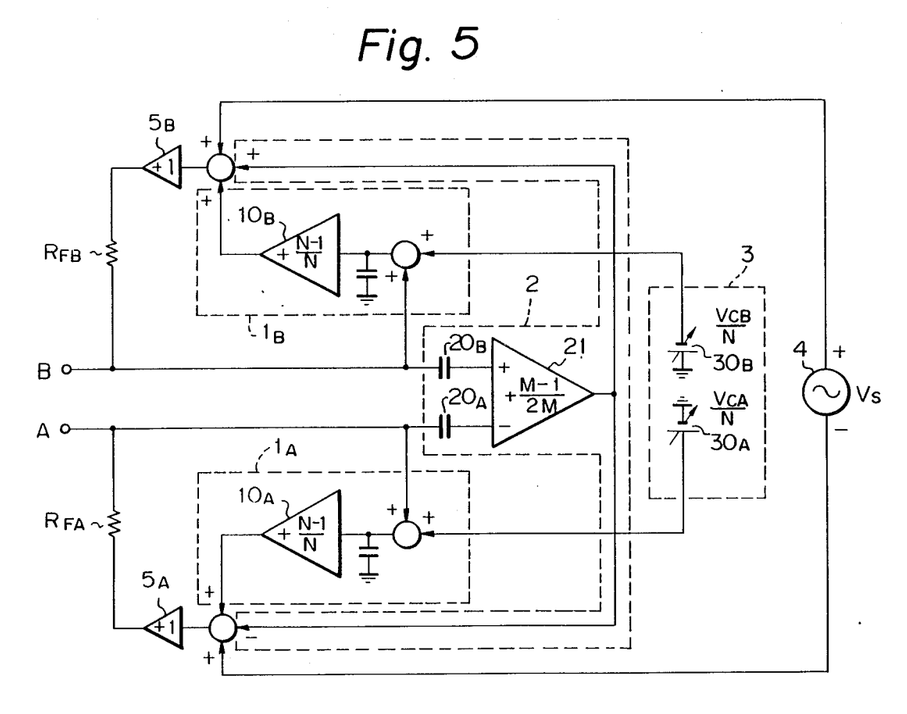
FIG. 5 and FIG. 6 are block diagrams of two different embodiments of battery-feed circuits according to the present invention.

FIG. 5 shows a block diagram of a fundamental configuration of the present invention. in FIG. 5, an A wire and a B wire are connected to a subscriber line or a trunk line (not shown). The battery-feed circuit of FIG. 5 realizes the ac feedback function for the ac signal on the A and B wires and the dc feedback function for the dc voltage on the A and B lines individually by using a dc feedback circuit and an ac feedback circuit.

That is, in FIG. 5, the battery-feed circuit comprises dc feedback circuits $1_A$ and $1_B$, each of which includes an amplifier ($10_A$ or $10_B$) having an amplification factor $(N-1)/N$; n an ac feedback circuit 2 including two capacitors $20_A$ and $20_B$ and an amplifier 21 having an amplification factor $(M-1)/2M$; n a polarity-reversal control signal generating circuit 3 including variable voltage sources $30_A$ and $30_B$; n a generator 4 for sending the sound signal to the subscriber line, two buffer amplifiers $5_A$ and $5_B$ having an amplification factor +1; and two feeding resistors (or reference resistors) $R_{FA}$ and $R_{FB}$.

The number N of the dc feedback circuit and the number M of the ac feedback circuit are constants for determining the dc equivalent supplying or feeding, resistance $R_{EF}$ and the ac terminating resistance $R_{DT}$. The relationships between them are as follows.

$$R_{EF}=R_F \times N$$

$$R_{DR}=R_R \times M \times 2$$

where $R_F$ is the resistance of the feeding resistors $R_{FA}$ and $R_{FB}$.

The characteristics of the FIG. 5 circuit are as follows.

First, in this circuit, the desired dc equivalent feeding resistance $R_{EF}$ and the desired ac terminating resistance $R_{DT}$ are obtained by means of effecting the dc positive feedback and ac positive feedback to the feeding resistors $R_{FA}$ and $R_{FB}$ so as to control the equivalent dc resistance and ac resistance of the feeding resistors.

·Second, two dc feedback circuits are provided independently for each of the A and B wires. Due to this construction, the power supply voltage of the operational amplifier used in the circuit may be lowered. As a result, no operational amplifier protection against high voltage is needed and the application to booster lines becomes possible.

Third, transmission of a response signal, charging signal, etc. is possible, since the voltage on the A and B wires may be controlled by the polarity-reversal control signal.

Fourth, the ac signal on the A and B wires is differentially amplified, whereby the differential signal, i.e., the voice signal, and the common mode signal, i.e., the undesired induced signal, are distinguished from each other. Accordingly, the terminating resistance for each signal can be made different by changing the feedback ratios of the feeding resistor between both signals. As a result, the common mode signal undesirable for the battery-feed circuit may be terminated with a low resistance, that is, the feeding resistors $R_{FA}$ and $R_{FB}$, and the voice signal may be terminated with the terminating resistance $R_{DT}$.

Figure 6:
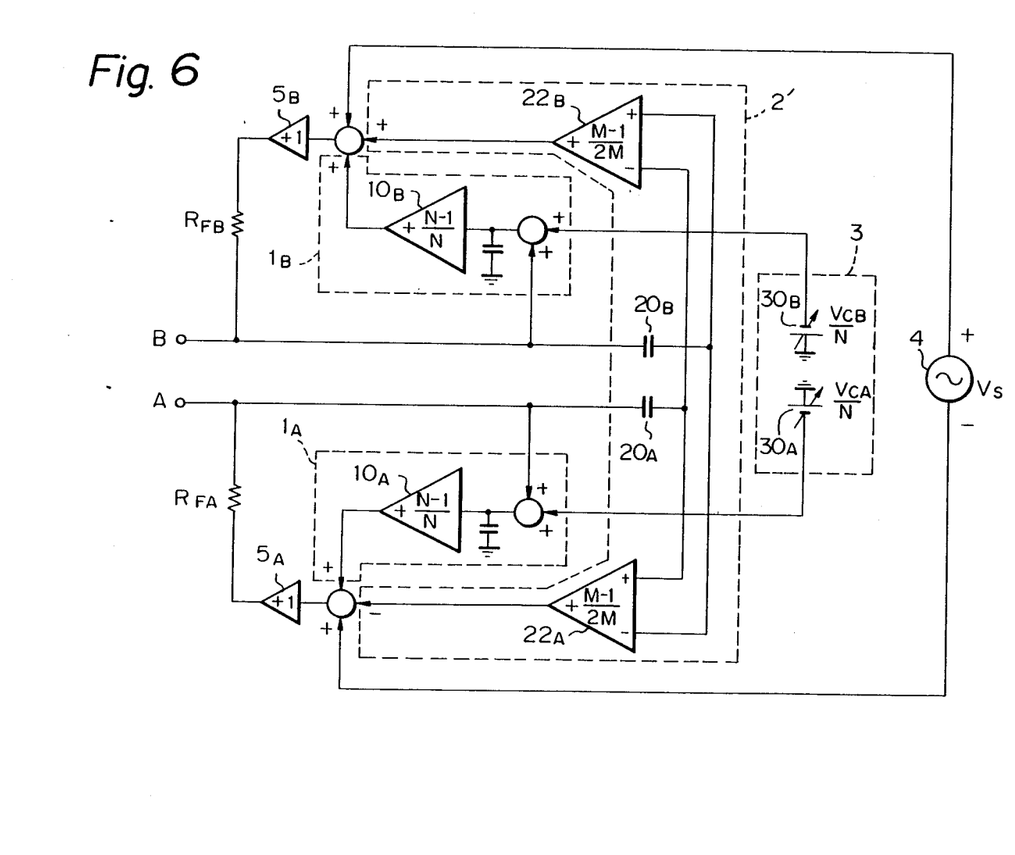

FIG. 6 shows a block diagram of a modified configuration of FIG. 5 according to the present invention. In this configuration, the ac feedback circuit 2' is different from that of FIG. 5. Namely, in FIG. 6, the ac feedback circuit 2' comprises two operational amplifiers $22_A$ and $22_B$ provided for the A and B wires.

Figure 2:
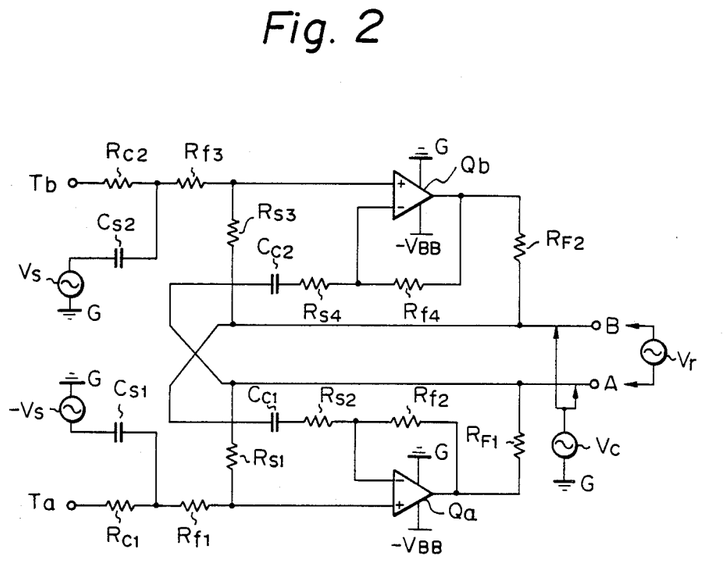
FIG. 2 is a circuit diagram of a battery-feed circuit according to one embodiment of the present invention.

FIG. 2 shows an embodiment derived from the fundamental configuration shown in FIG. 5 according to the present invention. In FIG. 2, an A wire and a B wire are connected to a subscriber wire or a trunk line (not shown). A received voice signal $V_r$ is input to the A and B lines. The battery-feed circuit of FIG. 2 is constructed symmetrically in the up and down direction by a feeding circuit for the A wire and a feeding circuit for the B line, the A line feeding circuit and B line feeding circuit being identical wire.

An operational amplifier $Q_a$ whose output terminal is connected to the A wire via a feeding resistor (or reference resistor) $R_{F1}$ is able to supply the speech current to the A wire. An A wire control voltage is applied to a noninverting input terminal of the operational amplifier $Q_a$ via a terminal $T_a$ and two resistors $R_{c1}$ and $R_{f1}$. A sending voice signal $V_s$ is applied to the connection point of the resistors $R_{c1}$ and $R_{f1}$ via a capacitor $C_{s1}$.

The A wire is connected to the noninverting input terminal of the operational amplifier $Q_a$, via resistor $R_{S1}$ and the B wire is connected to an inverting input terminal thereof via a capacitor $C_{c1}$ and a resistor $R_{s2}$. A feedback resistor $R_{f2}$ is connected between the inverting input terminal and an output terminal of the operational amplifier $Q_a$.

The formation of the feeding circuit for the B line is the same. This feeding circuit includes an operational amplifier $Q_b$, a feeding resistor $R_{F2}$, five resistors $R_{c2}$, $R_{f3}$, $R_{f4}$, $R_{s3}$, and $R_{s4}$, and two capacitors $C_{s2}$ and $C_{s2}$. The difference is that, in the feeding circuit for the B wire, the B wire is connected to a noninverting input terminal of the operational. amplifier $Q_b$ via the resistor $R_{s3}$, while the A wire is connected to an inverting input terminal thereof via the capacitor $C_{c2}$ and the resistor $R_{s4}$. A terminal $T_b$ is provided for receiving a B wire control voltage.

The relationship of the values of the parts in this battery-feed circuit are as follows.

$R_{c1}, R_{c2}=R_C$ $R_{s1}$ to $R_{s4}=R_s$ $R_{f1}$ to $R_{f4}=R_f$ $R_{F1}, R_{F2}=R_F$ $C_{s1}, C_{s2}=C_s$ $C_{c1}, C_{c2}=C_c$

These values of the resistors and the capacitors are selected so that, as described hereinafter in more detail, for example, a terminating resistance $R_{DT}$ for the received voice signal $V_r$ is 600Ω, an equivalent feeding resistance $R_{EF}$ is 200Ω, and a resistance to ground for the induced common mode signal is 50Ω.

The mode of operation of the FIG. 2 circuit will now be described.

The terminating resistance $R_{DT}$ for terminating the voice signal $V_r$ received from the speech line, the equivalent feeding resistance $R_{EF}$, measured from the power source to the speech line, for supplying the speech current or the supervision current to the speech line, the terminating resistance $R_{CT}$ (or the ground resistance)

for the induced common mode signal $V_c$, etc. are, in general, set at certain nominal values according to the exchange system. Accordingly, the battery-feed circuit of FIG. 2 must be designed to realize these nominal values. In this example, the battery-feed circuit is designed, so that the terminating resistance $R_{DT}$ is 600Ω, the equivalent feeding resistance $R_{EF}$ is 200Ω, and the terminating resistance $R_{CT}$ is 50Ω.

First, with regard to the reception and termination of the voice signal $V_r$ received from the speech path line, the present battery-feed circuit feeds back the received voice signal $V_r$ to the feeding resistors $R_{F1}$ and $R_{F2}$ by means of the positive feedback circuit so as to realize the desired terminating resistance $R_{DT}$ (600Ω), in spite of using the feeding resistors $R_{F1}$ and $R_{F2}$ having a low resistance (50Ω).

The impedances of the capacitors $C_{C1}$, $C_{C2}$, $C_{s1}$, and $C_{s2}$ are negligible in comparison to the resistors $R_s$ and $R_f$, since the impedance thereof with respect to the signal frequency of the received voice signal $V_r$ is small. Accordingly, the operational amplifiers $Q_a$ and $Q_b$ operate as a positive phase amplifier circuit with respect to the received voice signal $V_r$, whereby a part of the received voice signal $V_r$ is fed back to the feeding resistors $R_{F1}$ and $R_{F2}$ in a positive phase. As a result, the terminating resistance $R_{DT}$ for the received voice signal $V_r$ becomes greater than the feeding resistance $R_F$. The terminating resistance $R_{DT}$ is expressed as follows:

$$R_{DT} = \frac{2R_F \cdot R_s}{R_s - 2R_f} \quad (1)$$

As is clear from express (1), the terminating resistance $R_{DT}$ is greater than the feeding resistance $R_F$. If $R_{DT}$ and $R_F$ are given, the $R_s$ and $R_f$ may be decided on the basis of expression (1).

Next, in order to increase the tolerance against the common mode signal on the speech line, such as the undesired induced current, the battery-feed circuit of the present invention does not feed back the common mode signal $V_c$ to the feeding resistors $R_{F1}$ and $R_{F2}$, so the common mode signal $V_c$ is grounded via the feeding resistors $R_{F1}$ and $R_{F2}$. Accordingly, the ground terminating resistance $R_{CT}$ becomes equal to the low-resistance feeding resistors $R_{F1}$ and $R_{F2}$.

Namely, if the impedance of the capacitors $C_{C1}$ and $C_2$ is negligible in comparison to the resistance $R_s$ and $R_f$ with respect to the common mode induced signal $V_c$ applied to the A and B wire, each circuit containing the operational amplifiers $Q_a$ or $Q_b$ operates as a differential amplifier circuit, the input common mode signal $V_c$ being cancelled at each differential amplifier circuit. Accordingly, output signals corresponding to the common mode induced signal $V_c$ do not appear at each output terminal of the operational amplifiers $Q_a$ and $Q_b$.

As a result, the common mode induced signal $V_c$ is in effect, the same as if grounded via the feeding resistors $R_{F1}$ and $R_{F1}$. The terminating resistance $R_{CT}$ for the common mode induced signal $V_c$ is expressed as follows:

$$R_{CT} = R_F \quad (2)$$

Accordingly, if $R_F$ is 50Ω, the common mode induced signal $V_c$ is terminated to the ground by a 50Ω resistance. Hence, the tolerance against the common mode signal, such as the induced current, is raised due to this low ground terminating resistance.

Next, with regard to the feeding resistance for supplying the current to the A and B wires, in the present battery-feed circuit, the direct-current (dc) voltage on the speech line is fed back to the feeding resistors by means of dc positive feedback, so that the desired equivalent feeding resistance (for example, 200Ω) is obtained in spite of using feeding resistors having a low resistance (for example, 50Ω).

Namely, since the dc feedback loop of the operational amplifiers $Q_a$ and $Q_b$ is opened due to the capacitors $C_{c1}$ and $C_{c2}$, the operational amplifiers $Q_a$ and $Q_b$ function as a voltage follower circuit with respect to the dc voltage. Accordingly, the output voltages of the operational amplifiers $Q_a$ and $Q_b$ are equal to the input voltage applied to the noninverting input terminals thereof. In this case, the equivalent feeding resistance $R_{EFA}$ for the A wire and the equivalent feeding resistance $R_{EFB}$ for the B wire are expressed as follows.

$$R_{EFA} = R_{EFB} = \frac{R_F \cdot (R_s + R_f + R_c)}{R_s} \quad (3)$$

Since these equivalent feeding resistances $R_{EFA}$ and $R_{EFB}$ are calculated based on the voltage of the terminals $T_a$ and $T_b$, the voltage on the A and B wires may be changed by changing the control voltage applied to the terminals $T_a$ and $T_b$ while keeping the equivalent feeding resistances $R_{EFA}$ and $R_{EFB}$ constant.

Accordingly, the present battery-feed circuit can send a polarity-reversal signal by changing the voltage of the terminals $T_a$ and $T_b$. That is, the polarity of the voltage on the A and B wires is reversed according to the reverse of the polarity of the voltage on the terminals $T_a$ and $T_b$, whereby the polarity-reversal signal is sent to the speech line. In this case, the characteristics during the polarity reversal are quite the same as those under normal polarity, since the supply circuits of the A and B wires are constructed completely symmetrically.

Figure 3:
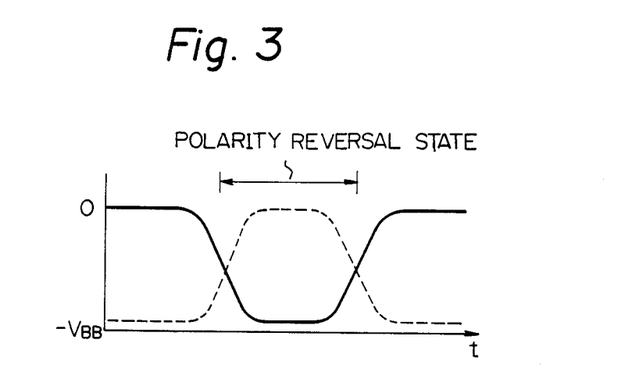
FIG. 3 is a graph of one example of a waveform of a polarity-reversal control signal for sending a noiseless polarity-reversal signal from the FIG. 2 circuit.

This means that a noiseless polarity-reversal signal may be easily sent by applying the smooth polarity reversal control voltage shown, for example, in FIG. 3 to the terminals $T_a$ and $T_b$. FIG. 3 shows one example of the control voltage waveforms on the terminal $T_a$ and $T_b$. In FIG. 3, the abscissa represents the voltage level on the terminals $T_a$ and $T_b$, the ordinate represents the time, the broken line is the voltage waveform on the terminal $T_a$, and the solid line is the voltage waveform on the terminal $T_b$.

Finally, the transmission of the voice signal to the A and B wires will be explained. The sending voice signals $V_s$ are input to the noninverting input terminals of the operational amplifiers $Q_a$, $Q_b$ via the capacitors $C_{s1}$, $C_{s2}$, and the resistors $R_{f1}$, $R_{f3}$. When the impedances of the capacitors $C_{s1}$, $C_{s2}$, $C_{c1}$, and $C_{c2}$ are small enough with respect to the frequency of the sending voice signal $V_s$ in comparison with other resistors and may be neglected, a sending voice signal voltage $V_t$ appearing across a load resistor $R_e$ (not shown) connected between the A and B wire is expressed as follows:

$$V_t = V_s \times \frac{2R_e}{2R_F + \frac{R_s - 2R_F}{R_s} \times R_e} \quad (4)$$

If the voice signal voltage $T_t$ to be sent and each resistance of the resistors are given, the value of the voice signal voltage $V_s$ to be input is determined from expression (4).

Figure 4:
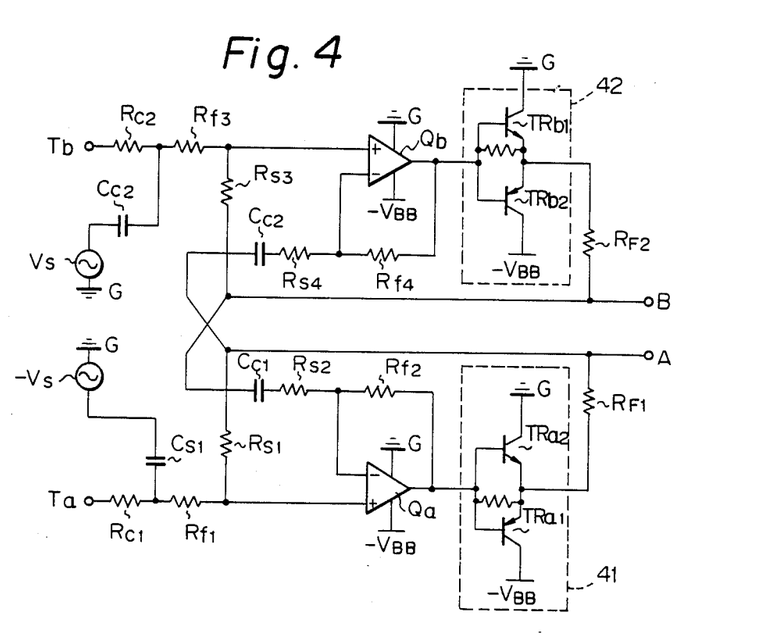
FIG. 4 is a circuit diagram of a battery-feed circuit according to another embodiment of the present invention.

Although preferred embodiments have been described heretofore, various modifications and alterations are possible within the scope of the present invention. FIG. 4 shows such another embodiment according to the present invention. In the battery-feed circuit of FIG. 2, if the speech current or the supervision current supplied from the battery-feed circuit is great, it is not possible to supply full current from the operational amplifiers $Q_a$ and $Q_b$. The circuit of FIG. 4 is improved so as to be able to supply a greater current, by using a power booster. In FIG. 4, the output voltage of the operational amplifier $Q_a$ is applied to the feeding resistor $R_{F1}$ via a power booster circuit 41 comprising a PNP type transistor $TR_{a1}$ and an NPN type transistor $TR_{a2}$. In the same way, the output voltage of the operational amplifier $Q_b$ is applied to the feeding resistor $R_{F2}$ via a power booster circuit 42, whereby the current supply to the A and B lines is effected.

We claim:

1. A battery-feed circuit for an exchange, comprising:
   a first wire;
   a second wire;
   a first reference resistor coupled to said first wire;
   a second reference resistor coupled to said second wire;
   signal supply means for supplying alternating and direct current signals to said first and second wires;
   first feedback means for feeding back alternating-current signals, and including first and second capacitors coupled to the first and second wires, respectively, so that alternating-current signals supplied to said first and second wires are fed back to said first and second wires via said first and second reference resistors, respectively, so as to provide a desired alternating-current terminating resistance;
   second feedback means for feeding back direct-current signals connected to the first and second wires, so that direct current voltage supplied to said first and second wires is fed back independently, with respect to said first and second wires, to the first and second wires via said first and second reference resistors, so as to provide a desired direct-current supplying resistance; and
   polarity reversal control signal generating means for controlling a polarity reversal of signals supplied to said first and second wires by supplying a polarity reversal control signal to said second feedback means.

2. A battery-feed circuit according to claim 1, wherein said second feedback means includes first and second direct-current feedback circuits coupled to said first and second wires, respectively.

3. A battery-feed circuit according to claim 1, wherein said first feedback means comprises one differential amplifier coupled to said first and second wires.

4. A battery-feed circuit according to claim 1, wherein said first feedback means comprises a first differential amplifier coupled to said first wire and a second differential amplifier coupled to said second wire.

5. A battery-feed circuit according to claim 2, wherein said polarity reversal means comprises first and second control means for inputting first and second polarity-reversal control signals to said first and second direct-current feedback circuits, respectively, sending the polarity-reversal control signals to said first and second wires and reversing a polarity of signals on said first and second wires.

6. A battery-feed circuit acording to claim 5, wherein the first and second control means each include inverting means for sending a noiseless polarity-reversal signal by inverting smoothly the polarity of the first and second polarity-reversal control signals.

7. A battery-feed circuit according to claim 1, further comprising means for supplying a sending voice signal to said first and second wires.

8. A battery-feed circuit according to claim 1, wherein said first and second feedback means comprise a pair of operational amplifiers respectively coupled to said first and second wires, respectively.

9. A battery-feed circuit according to claim 5, wherein said first feedback means, said second feedback means, and said first and second control means comprise a pair of operational amplifiers coupled to the first and second wires.

10. A battery-feed circuit according to claim 5, wherein said first and second feedback means comprise:
    a first amplifier, for supplying a speech current for the first line, having first and second input terminals, the first input terminal of said first amplifier coupled to the first wire and the second input terminal coupled to the second wire via said second capacitor; and
    a second amplifier, for supplying a speech current for the second line, having first and second input terminals, the first input terminal of second amplifier coupled to the second wire and the second input terminal of the second amplifier coupled to the second wire via said first capacitor.

11. A battery-feed circuit according to claim 10, wherein said first and second amplifiers are operational amplifiers.

12. A battery-feed circuit according to claim 10, wherein the first input terminals of said first and second amplifiers are noninverting input terminals, and the second input terminals thereof are inverting input terminals.

13. A battery-feed circuit according to claim 12, wherein said first and second amplifiers operate as a voltage follower circuit with respect to direct current signals present on said first and second wires, the direct current signals being positively fed back to said first and second wires via said first and second reference resistors, said first and second amplifiers operate as an alternating current positive feedback circuit with respect to a voice signal received between said first and second wires, the received voice signal being positively fed back to said first and second wires via said first and second reference resistors, and said first and second amplifiers do not respond to a common mode signal, said common mode signal being coupled to said first and second wires via said first and second reference resistors.

14. A battery-feed circuit according to claim 10, wherein the circuit further comprises means for generating first and second polarity-reversal control signals, the first polarity-reversal control signal being input to the first input terminal of said first amplifier, the second polarity-reversal control signal being input to the first input terminal of said second amplifier, so that a polarity reversal signal is sent to the first and second lines by controlling the first and second polarity-reversal control signals.

15. A battery-feed circuit according to claim 14, wherein said circuit includes means for sending a noiseless polarity-reversal signal by inverting the first and second polarity-reversal control signals.

16. A battery-feed circuit according to claim 10, wherein the circuit further comprises means for applying a sending voice signal between the first input terminals of said first and second amplifiers, so that said circuit sends the voice signal to the first and second lines.

17. A battery-feed circuit according to claim 10, wherein said circuit is formed so that the first reference resistance, first amplifier, first capacitance, and the interconnections thereof are identical to the second reference resistance, second amplifier, second capacitance, and the interconnections thereof, respectively.

18. A battery feed circuit for an exchange comprising:
a first wire;
a second wire;
a first reference resistance connected to said first wire;
a second reference resistance connected to said second wire;
means for providing a DC voltage on said first and second wires;
means for providing an AC signal on said first and second wires;
first feedback means for feeding the AC signal provided on said first and second wires back to said first and second wires via said first and second reference resistances; and
second feedback means for feeding back said DC voltage provided on said first and second wires, said second feedback means operating as a voltage follower circuit, to thereby feed said DC voltage independently, with respect to said first and second wires, back to said first and second wires via said first and second reference resistances.

19. A battery feed circuit according to claim 18, wherein said first and second feedback means comprise:
a first amplifier, for supplying a speech current to said first wire, having first and second input terminals, the first input terminal of said first amplifier being coupled to said first wire; and
a second amplifier, for supplying the speech current for said second wire, having first and second input terminals, the first input terminal of said second amplifier being coupled to said second wire, said first and second amplifiers operating as said voltage follower circuit with respect to the DC voltage on said first and second wires so tht the DC voltage is fed back to said first and second reference resistances by DC positive feedback, and said first and second amplifiers operating as an AC positive feedback circuit with respect to the AC signal, so that the AC signal is fed back to said first and second reference resistances by AC positive feedback.

20. A battery feed circuit according to claim 19, wherein the AC signal is a voice signal.

21. A battery feed circuit according to claim 19, further comprising means for generating a common mode signal, wherein said first feedback means further comprises:
a first capacitance coupled between said first line and the second input terminal of said second amplifier; and
a second capacitance coupled between said second line and the second input terminal of said first amplifier, so that said first and second capacitances cause said common mode signal to be terminated via said first and second reference resistances.

22. A battery feed circuit for an exchange, comprising:
a first wire;
a second wire;
a first reference resistor coupled to said first wire;
a second reference resistor coupled to said second wire;
a first amplifier, supplying a speech current to said first line, having a first non-inverting input terminal coupled to said first wire and a second inverting input terminal;
a second amplifier, supplying a speech current to the second wire, having a first non-inverting input terminal coupled to said second wire and a second inverting input terminal;
a first capacitance coupled between said first wire and said second input terminal of the second amplifier; and
a second capacitance coupled between said second wire and said second input terminal of the first amplifier, said first and second amplifiers operating as a voltage follower circuit with respect to direct current voltage on said first and second wires, so that the DC voltage is fed back to said first and second reference resistors by means of DC positive feedback, said first and second amplifiers operating in combination as an alternating current positive feedback circuit with respect to a received voice signal between said first and second wires, so that the received voice signal is fed back to said first and second reference resistors by means of an AC positive feedback, and said first and second amplifiers not responding to a common mode signal, so that the common mode signal is terminated to said first and second reference resistors.

23. A battery feed circuit for an exchange comprising:
a first wire;
a second wire;
a first reference resistor coupled to said first wire;
a second reference resistor coupled to said second wire;
a first amplifier for supplying a speech current to the first wire, having first and second input terminals, the first input terminal of said first amplifier coupled to said first wire;
a second amplifier, for supplying a speech current to the second wire, having first and second input terminals, the first input terminal of said second amplifier coupled to the second wire;
a first capacitance coupled between the first wire and the second input terminal of the second amplifier;
a second capacitance coupled between the second wire and the second input terminal of the first amplifier; and
means for generating first and second polarity reversal control signals, the first polarity reversal control signal being input to the first input terminal of said first amplifier, a second polarity reversal control signal being input to the first input terminal of said second amplifier, so that a polarity reversal signal is sent to the first and second wires by controlling the first and second polarity reversal control signals.

24. A battery feed circuit according to claim 23, wherein said circuit sends a noiseless polarity reversal signal by inverting the first and second polarity reversal control signals.

25. A battery feed circuit for an exchange, comprising:
- a first wire;
- a second wire;
- a first reference resistor coupled to said first wire;
- a second reference resistor coupled to said second wire;
- a first amplifier, supplying a speech current to said first wire, having a first non-inverting input terminal coupled to said first wire and a second inverting input terminal;
- a second amplifier, supplying a speech current to the second wire, having a first non-inverting input terminal coupled to said first wire and a second inverting input terminal;
- a first capacitance coupled between said first wire and said second input terminal of the second amplifier; and
- a second capacitance coupled between said second wire and said second input terminal of the first amplifier, said first and second amplifiers operating as a voltage follower circuit with respect to direct current voltage on said first and second wires, so that the DC voltage is fed back to said first and second reference resistors by means of DC positive feedback, said first and second amplifiers operating in combination as an alternating current positive feedback circuit with respect to a received voice signal between said first and second wires, so that the received voice signal is fed back to said first and second reference resistors by means of an AC positive feedback, and said first and second amplifiers not responding to a common mode signal, so that the common mode signal is terminated to said first and second reference resistor, said first reference resistors, said first amplifier, said first capacitance, and the innerconnections therebetween are connected identically as said second reference resistor, said second amplifier, said second capacitance and the innerconnections therebetween, respectively, whereby alternating current signals supplied to said first and second wires are fed back to said first and second wires via said first and second reference resistors, respectively, to provide a specific terminating impedance, and direct current voltages supplied to said first and second wires are fed back independently, with respect to said first and second wires, to said first and second wires via said first and second reference resistors, to provide a constant resistance feeding bridge.

26. A battery feed circuit for an exchange comprising:
- a first wire;
- a second wire;
- a first reference resistance connected to said first wire;
- a second reference resistance connected to said second wire;
- means for providing a DC voltage on said first and second wires;
- means for providing an AC signal on said first and second wires; and
- feedback means for providing the DC voltage and the AC signal to said first and second reference resistances, comprising:
  - a first amplifier, for supplying a speech current to said first wire, having first and second input terminals, the first input terminal of said first amplifier being coupled to said first wire; and
  - a second amplifier, for supplying the speech current for said second wire, having first and second input terminals, the first input terminal of said second amplifier being coupled to said second wire, said first and second amplifiers operating as a voltage follower circuit with respect to the DC voltage on said first and second wires so that the DC voltage is fed back to said first and second reference resistances by DC positive feedback, and said first and second amplifiers operating as an AC positive feedback circuit with respect to the AC signal, so that the AC signal is fed back to said first and second reference resistances by AC positive feedback.

27. A battery feed circuit according to claim 26, wherein the AC signal is a voice signal.

28. A battery feed circuit according to claim 26 further comprising means for generating a common mode signal, wherein said feedback means further comprises:
- a feed capacitance coupled between said first wire and the second input terminal of said second amplifier; and
- a second capacitance coupled between said second wire and the second input terminal of said first amplifier, so that said first and second capacitances cause said common mode signal to be terminated via said first and second reference resistances.

* * * * *

UNITED STATES PATENT AND TRADEMARK OFFICE
CERTIFICATE OF CORRECTION

PATENT NO. : 4,872,199
DATED : October 3, 1989
INVENTOR(S) : Shigeru Kawami et al.

It is certified that error appears in the above-identified patent and that said Letters Patent is hereby corrected as shown below:

Col. 1, line 65, "line" should be --wire--.

Col. 3, line 30, "$R_{DR} = R_R \times M \times 2$" should be --$R_{DT} = R_F \times M \times 2$--.

Col. 4, line 11, "line" (first occurrence) should be --wire--;

Col. 5, line 49, "$C_2$" should be --$C_{c2}$--.

Col. 7, line 1, "$T_t$" should be --$V_t$--.

Col. 8, line 24, "line," should be --wire,--;
line 30, "line," should be --wire,--.

Col. 9, line 9, "lines" should be --wires.--;
line 64, "line" should be --wire--;
line 68, "line" should be --wire--.

Col. 12, line 43, "feed" should be --first--.

Signed and Sealed this

Eighteenth Day of September, 1990

Attest:

HARRY F. MANBECK, JR.

*Attesting Officer*    Commissioner of Patents and Trademarks